Feb. 27, 1945.  A. E. KARLBERG  2,370,471
SHAFT SEAL
Filed Oct. 22, 1943

Inventor
Arvid E. Karlberg.
By

Patented Feb. 27, 1945

2,370,471

UNITED STATES PATENT OFFICE 2,370,471

SHAFT SEAL

Arvid E. Karlberg, Chicago, Ill., assignor to Chicago Seal Co., Chicago, Ill., a corporation of Illinois Application October 22, 1943, Serial No. 507,241

12 Claims. (Cl. 286—7)

This invention relates in general to seals for shafts, particularly adapted, though not necessarily limited in its use for sealing rotating shafts which project through a wall or bearing, to prevent escape or leakage of oil or gas, and one of the objects of the invention is to provide an improved seal assembly which may be employed as a replacement or repair unit adapted to be readily applied, and which will not impair or interfere with the free rotation, or other movements, of the shaft.

To the attainment of these ends and the accomplishment of other new and useful objects as will appear, the invention consists in the features of novelty in substantially the construction, combination and arrangement of the several parts, hereinafter more fully described and claimed and shown in the accompanying drawing illustrating the invention, and in which Fig. 1 is a view partly in elevation and partly in section of a portion of a shaft having a seal constructed in accordance with the principles of this invention applied thereto.

Figure 1:
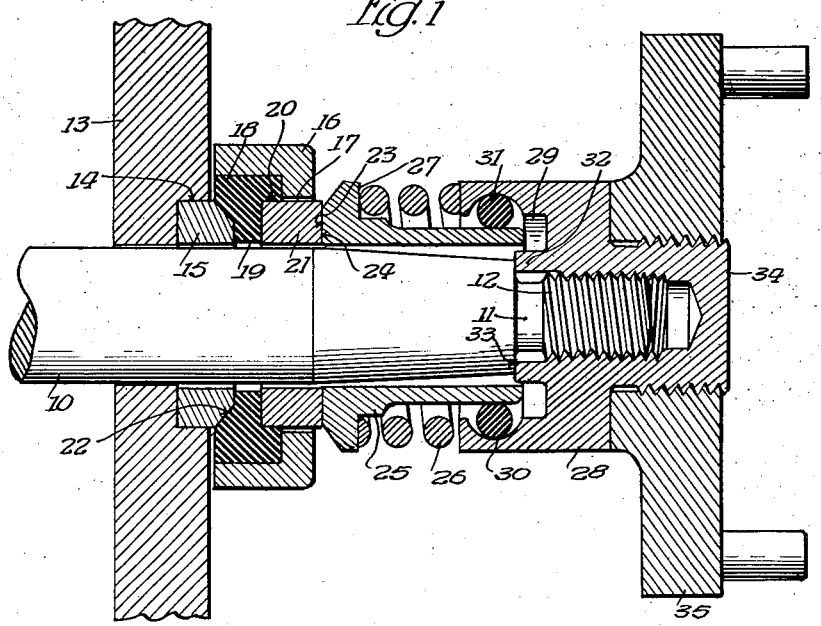
Figure 2:
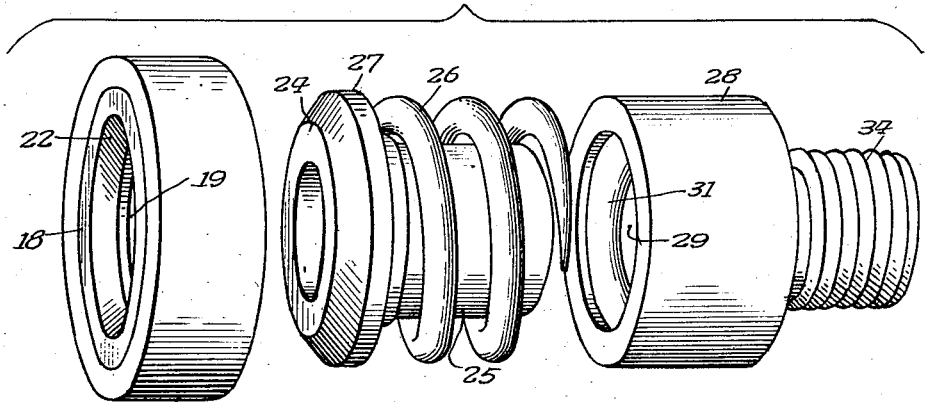
Fig. 2 is a perspective view of the several parts of the seal separated.
Figure 3:
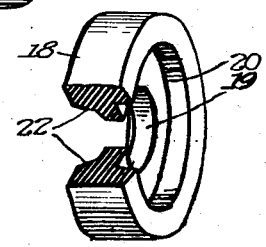
Fig. 3 is a perspective view, partly broken away, of a resilient sealing element.

In the drawing the numeral 10 designates, generally, a portion of a rotatable shaft which is to be sealed, and which is provided with a reduced end 11 that is threaded as at 12. The shaft passes through a wall 13, and the wall is preferably formed with a recess 14 encompassing the shaft opening. Seated in the recess is an annular member 15 which is formed of any suitable material and extends a suitable distance beyond the face of the wall to form a bearing or abutment member. The seal assembly is adapted for use as a replacement unit and is adapted to be applied without alteration of the shaft. It is also adapted to be initially installed in the apparatus of which the rotating shaft forms a part.

The seal consists essentially of a seal element embodying a cup shaped member 16 having an opening 17 through the bottom wall and through which opening the shaft 10 passes, the diameter of the opening being somewhat greater than the diameter of the shaft.

Seated within the member 16 to abut the inner face of the bottom wall thereof is a sealing member 18 constructed of any suitable resilient material, and is provided with an opening 19 through which the shaft passes and which opening registers with the opening 17. The diameter of the opening 17 is considerably greater than the diameter of the opening 19, the latter being slightly larger than the diameter of the shaft 10.

Opening through that face of the element 18 which is in proximity to the bottom of the member 16, is a recess 20, which is of a diameter less than the diameter of the opening 17 so that a portion of the element 18 will project beyond the wall of the opening 17. The recess 20 may be of any desired or suitable depth and receives the end of a collar or bearing member 21, formed of any suitable material. The member 21 is of an external diameter less than the diameter of the opening 17 to form a space therebetween and across which space a portion of the element 18 projects to hold the bearing member 21 out of contact with the wall of the opening 17 for a purpose to be set forth.

The element 18 is of a thickness preferably substantially equal to the depth of the cup shaped member 16, although it may be of a thickness to extend therebeyond, if desired, and abuts the bearing member 15.

The portion of the bearing member 15 with which the resilient element abuts is preferably of an external diameter considerably less than the diameter of the element 18, and projects into a recess 22 in the latter, so that a portion of the resilient element will overhang the adjacent edge or face of the bearing element 15, so as to assist in preventing oil or gas from escaping therebetween.

The bearing element 21 projects for a suitable distance beyond the outer face of the bottom wall of the cup shaped member 16, to form a bearing surface 23 against which a bearing surface 24 of a sleeve 25, that surrounds the shaft 10, has a running contact. The internal diameter of the sleeve 25 is greater than the external diameter of the adjacent portion of the shaft and encompassing the sleeve is a coil spring 26, one end of which bears against a shoulder or surface 27 of the sleeve, and the other end thereof bears against a fitting 28 that is screwed upon the threaded end 12 of the shaft. The fitting 28 is provided with a recess 29 into which one end of the sleeve 25 projects, the entrance end of the recess being of a diameter considerably larger than the external diameter of the adjacent part of the sleeve, and seated within an annular recess 30 in the wall of the opening is an annular resilient gasket or packing 31, which latter forms a seal to the escape of oil or gas that may find its way along the shaft and through the sleeve.

By adjustment of the fitting 28 upon the end of the shaft the stress of the spring 26 may be varied and as the spring operates to hold the bearing surface 24 of the sleeve in contact with the face of the bearing member 21, the degree of friction therebetween can be controlled. If desired there may be provided a stop or abutment 32, within the recess 29, which is adapted to abut a shoulder 33 on the shaft 10, to limit the adjustment of the fitting in one direction with respect to the shaft.

The fitting 28 may be provided with a reduced threaded portion 34 upon which a coupling member 35 may be screwed.

With this improved construction of seal it will be seen that the pressure of the spring 26 will hold the bearing surface 24 of the sleeve 25 in running contact with the bearing member 21, and this in turn will hold the sealing element 18 in contact with the bearing member 15, thereby forming a fluid tight joint, the friction created between the resilient element 18 and the face of the bearing member 15, maintains the sealing unit 18, 16 and 21 against rotation. Inasmuch as the bearing element 21 is of an external diameter considerably less than the diameter of the opening 17 in the cup shaped member 16, the bearing member 21 will be free to be rocked with respect to the member 16, to compensate any irregularities or lateral movement of the shaft, or for any other reason, without rocking or shifting the element or member 16, as in such an event the resilient element 18 will yield adjacent the bearing element 21 while the portion thereof which is in contact with the bearing member 15, will be maintained in tight sealing contact therewith. This is accomplished by reason of the fact that the bearing element 21 is separate from the element 16, and the space between the elements 21 and 16 is sealed by the resilient element, thereby maintaining the element 16 and a portion of the resilient element 18 against such rocking or tilting movement.

The friction created between the bearing element 21 and the resilient sealing element 18, is also sufficient to prevent rotation of the bearing element 21.

While the preferred form of the invention has been herein shown and described, it is to be understood that various changes may be made in the details of construction and in the combination and arrangements of the several parts, within the scope of the claims, without departing from the spirit of this invention.

What is claimed as new is:

1. A replacement seal for a rotating shaft which projects through a wall opening, said seal embodying as an assembled unitary structure, a sealing member provided with an opening therethrough and a recess encompassing the opening and itself opening through one face of the member, an annular resilient sealing element seated in said recess, said resilient element having a recess opening through one of its faces, encompassing and in register with the opening through the said sealing member, the diameter of the recess in the resilient element being greater than the said opening therethrough and less than the opening through the first said sealing member, and a bearing member seated in the said recess and extending through the opening in the first said sealing member, the external diameter of the said bearing member being less than the diameter of the opening through the first said sealing member, the opposite face of said resilient element abutting a bearing surface which encompasses the said shaft in proximity to said wall, a rotatable element having running contact with the said bearing member, and means for maintaining the parts of the seal in frictional engagement.

2. A replacement seal for a rotating shaft which projects through a wall opening, said seal embodying as an assembled unitary element, a sealing member provided with an opening therethrough and a recess encompassing the opening and itself opening through one face of the member, an annular resilient sealing element seated in said recess, said resilient element having a recess opening through one of its faces, encompassing and in register with the opening through the said sealing member, the diameter of the recess in the resilient element being greater than the said opening therethrough and less than the opening through the first said sealing member, a bearing member seated in the said recess and extending through the opening in the first said sealing member, the external diameter of the said bearing member being less than the diameter of the opening through the first said sealing member, the other face of said resilient element abutting a bearing surface which encompasses the said shaft in proximity to said wall, in combination with a rotatable element having running contact with said bearing member, means for maintaining the parts of the seal in frictional engagement, and means forming a fluid tight seal between said rotatable element and the said shaft.

3. A replacement seal for a rotating shaft which projects through a wall opening, said seal embodying as an assembled unitary structure, applicable in and removable from the sealing organization, as such, a sealing member provided with an opening therethrough and a recess encompassing the opening and itself opening through one face of the member, an annular resilient sealing element seated in said recess, said resilient element having a recess opening through one of its faces, encompassing and in register with the opening through the said sealing member, the diameter of the recess in the resilient element being greater than the said opening therethrough and less than the opening through the first said sealing member, a bearing member seated in the said recess and extending through the opening in the first said sealing member, the external diameter of the said bearing member being less than the diameter of the opening through the first said sealing member, the other face of said resilient element abutting a bearing surface which encompasses the said shaft in proximity to said wall, in combination with a rotatable element having running contact with said bearing member, and means for maintaining the parts of the seal in frictional engagement, a portion of the said resilient sealing element overhanging the said bearing surface.

4. For use in a sealing organization of the character described, and as an article of manufacture, an assembled unitary sealing structure embodying a body member having a shaft opening therethrough and provided with a circumferential flange on one face thereof, an annular resilient sealing element seated within and held in place by said flange, said element having a shaft opening registering with the first said shaft opening and being provided with a recess encompassing said opening and itself opening through that face of the said element which is adjacent the said body member, the diameter of the said recess being greater than that of the shaft opening therein, and less than that of the shaft opening in the said body, and a bearing member seated in the recess in the resilient element and extending through the shaft opening in the said body member, the external diameter of the said bearing member being less than the diameter of the shaft opening in the body member, whereby the bearing member will be maintained out of contact with the wall of the shaft opening in said body member.

5. For use in a sealing organization of the character described, and as an article of manufacture, an assembled unitary sealing element embodying a body member having a shaft opening therethrough and provided with a circumferential flange on one face thereof, an annular resilient sealing element seated within and held in place by said flange, said element having a shaft opening registering with the first said shaft opening and being provided with a recess encompassing said opening and itself opening through that face of the said element which is adjacent the said body member, the diameter of the said recess being greater than that of the shaft opening therein, and less than that of the shaft opening in the said body, and a bearing member seated in the recess in the resilient element and extending through the shaft opening in the said body member, the external diameter of the said bearing member being less than the diameter of the shaft opening in the body member, whereby the bearing member will be maintained out of contact with the wall of the shaft opening in said body member, the said resilient element being also provided with a bearing receiving recess opening through the other face thereof.

6. For use in a sealing organization of the character described, and as an article of manufacture, an assembled unitary sealing structure, adapted for insertion into and removable from the sealing organization, as such, and embodying a body member having a shaft opening therethrough and provided with a circumferential flange on one face thereof, an annular resilient sealing element seated within and held in place by said flange, said element having a shaft opening registering with the first said shaft opening and being provided with a recess encompassing said opening and itself opening through that face of the said element which is adjacent the said body member, the diameter of the said recess being greater than that of the shaft opening therein and less than that of the shaft opening in the said body, and a bearing member seated in the recess in the resilient element and extending through the shaft opening in the said body member, the external diameter of the said bearing member being less than the diameter of the shaft opening in the body member, whereby the bearing member will be maintained out of contact with the wall of the shaft opening in said body member, the said bearing member extending beyond the face of the body member opposite to that beyond which the flange projects, to form a running bearing for a member which contacts therewith.

7. As an assembled unit of manufacture, a replacement seal for a rotating shaft which extends through and beyond a bearing, said unit embodying a washer like member, an annular resilient sealing element abutting one face of the said member, means for maintaining said member and said element in assembled relation with the openings through them in registering relation, said element having a recess encompassing the opening therethrough and itself opening through that face of the element which is in proximity to the first said member, said recess being of a diameter less than the diameter of the opening through the first said member, and a bearing member seated in said recess, extending through the opening in, and projecting beyond the first said member.

8. A replacement seal for a rotating shaft which extends through and beyond a bearing as an assembled unit of manufacture, embodying a washer like member, an annular resilient sealing element abutting one face of the said member, means for maintaining said member and said element in assembled relation with the openings through them in registering relation, said element having a recess encompassing the opening therethrough and itself opening through that face of the element which is in proximity to the first said member, said recess being of a diameter less than the diameter of the opening through the first said member, and a bearing member seated in said recess, extending through the opening in and projecting beyond the first said member, in combination with a rotatable element having a running contact with the said bearing member, and means for maintaining said rotatable element and said bearing member in contact.

9. A replacement seal for a rotating shaft which extends through and beyond a bearing as an assembled unit of manufacture, embodying a washer like member, and annular resilient sealing element abutting one face of the said member, means for maintaining said member and said element in assembled relation with the openings through them in registering relation, said element having a recess encompassing the opening therethrough and itself opening through that face of the element which is in proximity to the first said member, said recess being of a diameter less than the diameter of the opening through the first said member, a bearing member seated in said recess, extending through the opening in and projecting beyond the first said member, in combination with a rotatable element having running contact with said bearing member, and resilient means for maintaining said rotatable element in contact with said bearing member and said resilient element in engagement with the first said bearing.

10. As an article of manufacture, a seal unit for a rotating shaft, comprising as a unitary structure, a ring member removably applicable around a shaft in position engaging a wall through which the shaft extends, said ring member supporting resilient, rubber-like gasket means on one face thereof in position to frictionally engage and grip the wall around the shaft, said gasket means having an opening therethrough registering with and of a diameter less than, the diameter of the opening in the ring member, and a bearing member seated in the opening in the gasket means, extending through the ring member and projecting beyond the outer face of the ring member, said bearing member being maintained out of contact with the wall of the opening in the said ring member.

11. As an article of manufacture, a seal unit for a rotating shaft, comprising a ring member removably applicable around a shaft in position engaging a wall through which the shaft extends, said ring member supporting a resilient gasket one face of which frictionally engages and grips the wall around the shaft, said gasket having an opening therethrough registering with, and of a diameter less than the diameter of the opening in the ring member, said gasket also provided with a recess encompassing the opening therein, said recess being of a diameter greater than the diameter of the opening in the gasket and less than the diameter of the opening in the ring member, and a bearing member seated in said recess and extending through the opening in, and beyond the face of the ring member, the outer end of said bearing member forming a finished seal seat.

12. A replacement seal for a rotating shaft which extends through and beyond a bearing, said seal embodying as an assembled unitary structure, a washer-like member having a circumferential flange extending beyond one face, a resilient element seated within and substantially filling the space within said flange, said element having recesses in opposite faces to provide an intermediate wall, said wall having an opening registering with and of less diameter than the opening in said washer member, the diameter of the recess adjacent the body of the washer member being less than the diameter of the opening through the washer member, a bearing member seated in the last said recess and extending through the opening in the washer member, the diameter of the last said bearing member being less than the diameter of the opening in the washer member, in combination with a seal member having a running contact with the said bearing member, and means for maintaining the parts in contact, the pressure exerted upon said resilient element being only in a direction lengthwise of the axis of the element.

ARVID E. KARLBERG.